United States Patent
Nakamura

(10) Patent No.: US 6,526,040 B1
(45) Date of Patent: Feb. 25, 2003

(54) EXCHANGE NETWORK SYSTEM

(75) Inventor: Teruo Nakamura, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/332,966

(22) Filed: Jun. 15, 1999

(30) Foreign Application Priority Data

Jun. 15, 1998 (JP) .......................................... 10-167330

(51) Int. Cl.⁷ .............................................. H04J 15/00
(52) U.S. Cl. ..................................... 370/351; 370/400
(58) Field of Search ............................... 370/216–218, 370/225, 228, 351, 389, 390, 392, 395.1, 395.2, 395.3, 395.4, 400, 401, 410, 464, 475, 498, 537

(56) References Cited

U.S. PATENT DOCUMENTS

| | | | | |
|---|---|---|---|---|
| 5,084,816 A | * | 1/1992 | Boese et al. | 370/225 |
| 5,539,884 A | * | 7/1996 | Robrock, II | 370/399 |
| 6,366,582 B1 | * | 4/2002 | Nishikado et al. | 370/401 |

FOREIGN PATENT DOCUMENTS

| | | |
|---|---|---|
| JP | 59-58940 | 4/1984 |
| JP | 2-86244 | 3/1990 |
| JP | 07-38642 | 7/1995 |
| JP | 7-177172 | 7/1995 |
| JP | 10-13534 | 1/1998 |

* cited by examiner

Primary Examiner—Salvatore Cangialosi
(74) Attorney, Agent, or Firm—Foley & Lardner

(57) ABSTRACT

An interface connected to a local area network is mounted in each of data transfer circuits 19, 1a to 1c, 28, 29 and 36 for establishing logical connection of exchanges to one another such that it can connect a plurality of data transfer circuits provided in each exchange to one another. It is thus possible to obtain joint establishment of a logical mesh structure by individual data transfer circuits and, when a data transfer circuit receives data to be transferred to a different exchange from its own, obtain alleviation of the load in the own exchange with a process of data transfer between the data transfer circuits that is executed by using the local area network side interface.

3 Claims, 1 Drawing Sheet

EXCHANGE NETWORK SYSTEM

BACKGROUND OF THE INVENTION

The present invention relates to exchange network systems and, more particularly, to logical connection control systems capable of ready realization of a redundant structure for improving the reliability of logical connection used for communication between exchanges.

In prior art logical connection based on a common line signal system, for instance, link control is executed between data transfer circuits via an exclusive digital line. Therefore, for providing mutual logical connection among a plurality of exchanges, it is necessary to provide a data transfer circuit for each exchange. In addition, in many common line signal systems, a function of transferring control data via a CPU (i.e., software processing) in each exchange is defined.

In the prior art, however, as described above link control of logical connection is executed only between data transfer circuits connected to each other via an exclusive digital line. Therefore, where a plurality of exchanges are present, a data transfer circuit is necessary for each exchange, thus leading to corresponding cost increase and complicating the hardware structure.

Furthermore, although in the above common line signal system the control data transfer function is defined, logical connection is established only between data transfer circuits (i.e., between exchanges). Therefore, for the transfer of control data, the processing is performed via the CPU (i.e., software processing) in each exchange, thus necessitating extra loading of the CPU in each exchange.

SUMMARY OF THE INVENTION

The present invention was made in view of the above background, and it has an object of providing a logical connection control system, which permits readily realizing a logical mesh structure without unnecessary loading to the CPU in each exchange, thus improving the system maintenance and the reliability of the logical connection.

According to the present invention, an interface connected to a local area network is mounted in a data transfer circuit for establishing a logical inter-exchange connection such that it can connect a plurality of data transfer circuits provided in an exchange to one another. Thus, individual data transfer circuits can jointly establish logical inter-exchange connection. It is thus possible to to readily realize logical connection, which is simple in physical hardware constitution and realizes a logical mesh structure. In addition, since a plurality of data transfer circuits can be connected to one another by the local area network interface, when a data transfer circuit receives data to be transferred to a different exchange from its own, the load of the CPU (i.e., software processing) in the own exchange can be alleviated by the execution of a process of data transfer between the data transfer circuits by using the local area network side interface.

According to an aspect of the present invention, there is provided a logical connection control system, that is, in an exchange network having a plurality of exchanges, a logical connection control system, wherein each exchange includes an exchange execution unit, a communication control unit for controlling the execution of communication between exchanges and a logical connection control circuit for establishing a route for exchanging control data with a different exchange, and can establish logical connection between exchanges for exchanging control data therebetween.

The communication control unit has a function of updating routing data according to the status of establishment of logical connection from the logical connection control circuit to each exchange, a function of storing the routing data in a routing data control circuit and a function of communicating with a different exchange via the logical connection control circuit.

Each exchange includes two communication control drivers for establishing logical connection between exchanges that is necessary when transmitting data to a different exchange under control of an instruction from the communication control unit, and the logical connection control unit has a function of determining, according to routing data, which one of the two communication control drivers is to be used.

An interface of a local area network connects each communication control driver via a local area network connector to a plurality of data transfer circuits.

Each exchange includes a plurality of data transfer circuits each having two different interfaces, one connected to an exclusive digital line and the other connected to a local area network, and the communication control unit can be connected to a data transfer circuit in a different exchange via a pertinent exclusive digital line while being connected to all the data transfer circuits in the own exchange via the local area network.

Each data transfer circuit has a function of communicating with a data transfer circuit in a different exchange via the exclusive digital line interface and receiving various states of the data transfer circuit in the different exchange.

The communication control unit has a function of distributing routing data stored in the routing data control circuit to all the data transfer circuits in the own exchange via the local area network interface.

When the data transfer circuit receives data transmitted from a different exchange via an exclusive digital line, it refers to destination exchange identification number contained in the received data and, if the received data is destined to a different exchange, determines, from routing data having been distributed from the communication control unit and held in it, the destination data transfer circuit, thus permitting direct transmission and reception of data between the data transfer circuits without agency of the control of the exchange execution unit in each exchange but via the local area network interface.

When no data transfer circuit in a different exchange which is found as a data relay destination in the own local area network is present, the data transfer circuit informs the communication control unit in the own exchange that no relay destination is present.

Wherein when the communication control unit is informed from the data transfer circuit that no relay destination is present, it retrieves, with reference to routing data stored in the routing data control circuit, for a data transfer circuit, which is present as a delay destination in a different local area network from the one of the informing data transfer circuit and, if such a relay destination data transfer circuit is present, secures communication between the exchanges by transmitting data to the relay destination data transfer circuit.

According to another aspect of the present invention, there is provided a logical connection control system, wherein an interface connected to a local area network is mounted in a data transfer circuit for establishing connection between exchanges, and a plurality of data transfer circuits mounted in the own exchange are connected one another via the local area network interface, thus providing a logical mesh structure about logical connection of exchanges to one another.

According other aspect of the present invention, there is provided a logical connection control system, wherein an interface connected to a local area network is mounted in a data transfer circuit which establishes connection between exchanges, and a plurality of data transfer circuits mounted in the own exchange are connected one another via the local area network interface one another, so that it can be used, when a data transfer circuit receives data to be transferred to a different exchange, for a process of data transfer between the data transfer circuits.

Other objects and features will be clarified from the following description with reference to attached drawings.

PREFERRED EMBODIMENTS OF THE INVENTION

Figure 1:
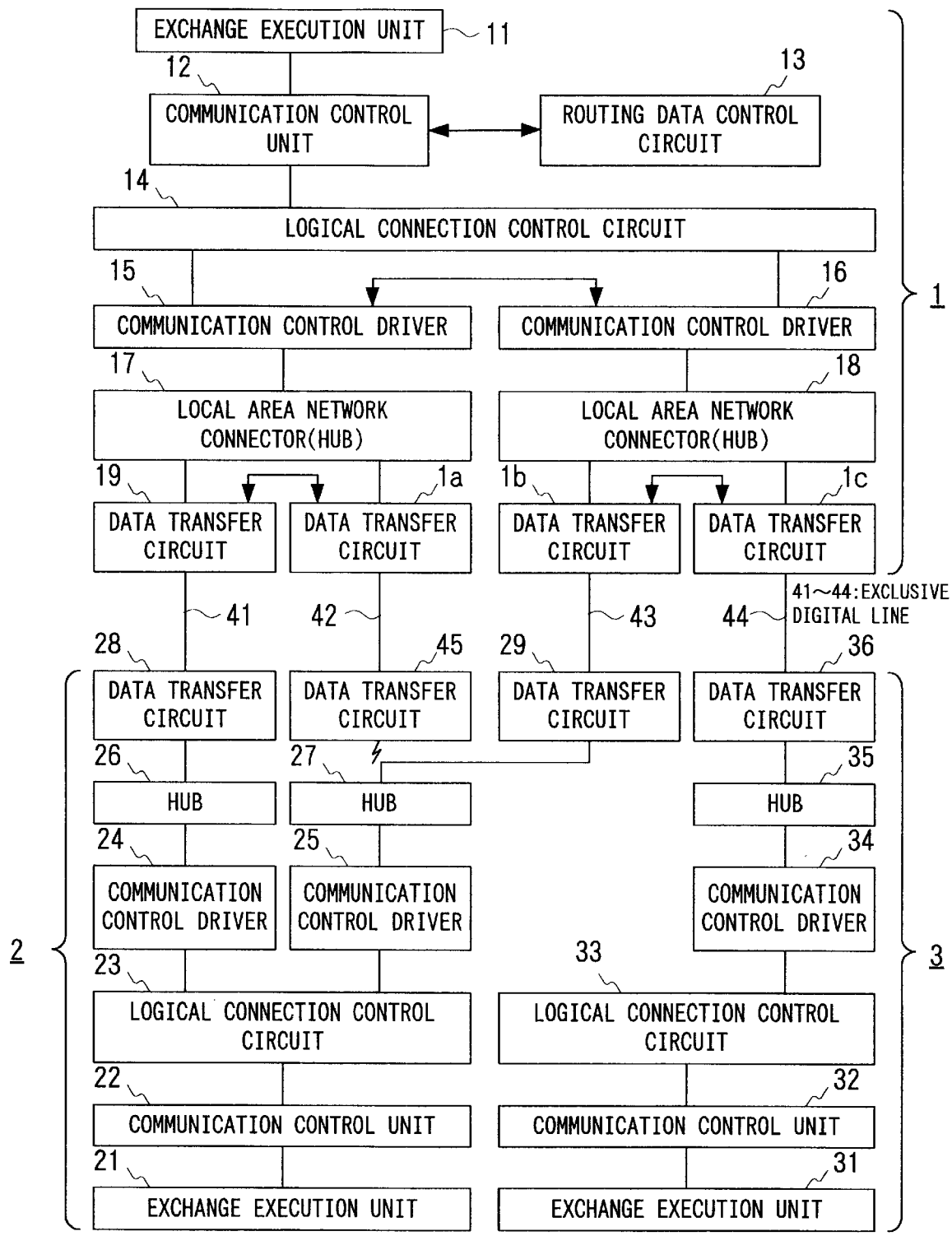
FIG. 1 is a block diagram showing an exchange network embodying the present invention.

Preferred embodiments of the present invention will now be described with reference to the drawings. A musical sound control system as an embodiment of the present invention will now be described with reference to the drawings.

FIG. 1 is a block diagram showing an exchange network embodying the present invention. The illustrated exchange network comprises three exchanges 1 to 3. The exchange 1 is directly connected via digital exclusive lines to the exchanges 2 and 3.

The exchanges 1 to 3 includes exchange execution units 11, 21 and 31 performing exchange services, communication control units 12, 22 and 23 for controlling the transmission and reception of control data to and from other exchanges from their own ones according to instructions of communication with the other exchanges provided from the exchange execution units 11, 21 and 31, logical connection control circuits 14, 23 and 33 for controlling the establishment of logical connection with other exchanges than their own ones, communication control drivers 15, 16, 24, 25 and 34, at most two thereof being mounted in each exchange (for providing a redundant constitution as a measure against local area network connector lock-up) for the control of devices connected to a local area network, local area network connectors or connecting points or connectors (HUBs) 17, 18, 26, 27 and 35, and data transfer circuits (MTPs) 19, 1a to 1c, 28, 29 and 36 for providing exclusive processes of transmitting and receiving control data.

In the above construction, the exchange 1 functions as follows. In the exchange 1, the communication control unit 12 monitors the state of the transmission lines of the data transfer circuits 19 and 1a to 1c via the logical connection circuit 14, communication control drivers 15 and 16 and HUBs 17 and 18. The communication control unit 12 thus discriminates routes capable of being used and incapable routes from each other, and generates routing data. The routing data thus generated is stored in a routing data control circuit 13.

The communication control unit 12 also real time monitors the state of the data transfer circuits, and when the state thereof is changed, it instantly updates the routing data and stores the updated data in the routing data control circuit 13. The routing data is real time distributed to all the data transfer circuits connected via the HUBs.

Of the data transfer circuits 19 and 1a to 1c in the exchange 1, the data transfer circuits 19 and 1a are connected to the HUB 17, while the other data transfer circuits 1b and 1c are connected to the other HUB 18. By using this hardware structure, a perfect redundant system comprising communication control drivers, HUBs and data transfer circuits can be constructed.

Now, the process sequence of data transmission from the exchange 2 to the exchange 1 will be described. The data transfer circuits 19 and 1b in the exchanges 1 and 2, are connected via exclusive digital lines to the data transfer circuits 28 and 29, respectively.

When it becomes necessary for the exchange execution circuit 21 in the exchange 2 to transmit control data to the exchange 1, the exchange execution unit 21 instructs communication data to the communication control unit 22. The communication control unit 22 thus determines, with reference to routing data, which one of the data transfer circuits 28 and 29 is to be used, and instructs the transmission of control data, to the determined data transfer circuit via the pertinent logical connection control circuit, communication control driver and HUB.

The data transfer circuit, in response to receipt of the control data to be transmitted via the local area network side interface, transmits the control data to be transmitted to the data transfer circuit in the exchange 1 connected via the exclusive digital line to it. The data transfer circuit in the exchange 1, in response to receipt of the control data through the exclusive digital line side interface, transmits, according to destination exchange identification number data contained in the control data and also with reference to routine data having been transmitted from the communication control unit and held therein, the control data via the local area network side interface for the transfer of the control data to the exchange execution unit 11 in the exchange 1. The control data thus transmitted from the data transfer circuit in the exchange 1 to the local area network side, is transferred to the exchange execution unit 11 in the exchange 1 via the pertinent HUB, communication control driver, logical connection control circuit and communication control unit.

Now, the process sequence of data transmission from the exchange 2 to the exchange 3 will be described. The data transfer circuits 19 and 1b in the exchange 1 and 2, are connected via exclusive digital lines to the data transfer circuits 28 and 29, respectively. The data transfer circuit 1c in the exchange 1 is connected via an exclusive digital line to the data transfer circuit 36 in the exchange 3.

As is obvious from FIG. 1, no direct control data transfer routing is present between the exchanges 2 and 3. However, the data transfer circuits in the exchange 1 include those 1b and 1c, which are connected via exclusive digital lines to the data transfer circuits in the exchanges 2 and 3, respectively. These data transfer circuits 1b and 1c are connected via the HUB 18 to the local area network side interface.

Thus, when it becomes necessary for the exchange execution unit 21 in the exchange 2 to transmit control data to the exchange 3, the exchange execution unit 21 in the exchange 2 instructs transmission data to the communication control unit 22. The communication control unit 22 thus instructs the transmission of control data, with reference to routing data, to the data transfer circuit 29 via the pertinent logical connection control circuit, communication control driver and HUB so that the data transfer circuit 29 is used for communication to transmit the control data to the exchange 3. The data transfer circuit 29, in response to receipt of the control data to be transmitted from the local area network side interface, transmits the control data to be transmitted to the data transfer circuit 1*b* in the exchange 1 connected via the exclusive digital line to it.

The data transfer circuit 1*b* in the exchange 1, in response to receipt of the control data from the exclusive digital line side interface, transmits, with reference to routing data which has been transmitted from the communication control unit and held therein, on the basis of the destination exchange identification number (the exchange 3 in this case) included in the received control data, the control data via the local area network side interface to the data transfer circuit 1*c* without agency of CPU (software processing) in the exchange 1 for transfer of the control data to the exchange execution unit 31 of the exchange 3. The data transfer circuit 1*c*, in response to receipt of the control data via the local area network side interface, transfers the control data to the data transfer circuit 36 in the exchange 3, connected via the exclusive digital line to it.

The data transfer circuit 36, in response to receipt of the control data via the exclusive digital line side interface, transmits, according to destination exchange identification number data contained in the control data and also with reference to the routing data having been transmitted from the communication control unit and held therein as noted above, the control data via the local area network side interface for the transfer of the control data to the exchange execution unit 31 in the exchange 3.

The control data thus transmitted from the data transfer circuit 36 in the exchange 3 to the local area network side, is transferred via the HUB 35, the communication control driver 34, the logical connection control circuit 33 and the communication control unit 32 to the exchange execution unit 31 in the exchange 3.

Now, the process sequence of data transmission from the exchange 2 to the exchange 3 in the event of a trouble in the data transfer circuit 29 in the exchange 2, will now be described. The data transfer circuits 19 and 1*c* in the exchange 1 are connected via exclusive digital lines to the data transfer circuits 28 and 36 in the exchanges 2 and 3, respectively.

As is obvious from FIG. 1, no direct control data transfer routing is present between the exchanges 2 and 3. Besides, since the data transfer circuit 29 in the exchange 2 is in trouble, no data transfer is connected via the HUB 18 to the local areas network side interface as noted above is present.

In this case, transmission control data exchange between the HUBs 17 and 18 is executed under software control of the CPU in the exchange 1.

More specifically, when it becomes necessary for the exchange execution unit 21 in the exchange 2 to transmit the control data to the exchange 3, the exchange execution unit 21 in the exchange 2 instructs the communication data to the communication control unit 22. The communication control unit 22 thus instructs the transmission of control data, with reference to the routing data, to the data transfer unit 28 via the pertinent logical connection control circuit, communication control driver and HUB so that the data transfer circuit 28 is used for communication to transmit the control data to the exchange 3.

The data transfer circuit 28, in response to receipt of the control data to be transmitted from the local area network side interface, transmits the control data to the data transfer circuit 19 in the exchange 1 connected via the exclusive digital line to it. The data transfer circuit 19 in the exchange 1, in response to receipt of the control data from the exchange digital line side interface, refers, according to destination exchange identification data (of the exchange 3 in this case) contained in the control data, to the routing data having been transmitted from the communication control unit and held therein as noted above. Since the routing data shows no data transfer circuit which belongs to the HUB with the data transfer circuit 19 connected thereto and is capable of executing data transfer process with respect to the exchange 3, it is determined that no destination is present, and the control data to be transferred is transmitted to the communication control unit 12 in the exchange 1.

The communication control unit 12, in response to receipt of the control data, executes, with reference to the routing data having been stored in the routing data circuit 13, a retrieval for any data transfer circuit, which belongs to the communication control driver 16 other than the communication control driver 15 having received the control data and is capable of executing control data transfer to the exchange 3. Subsequently, the communication control unit 12 determines, from the routing data, that communication with the exchange 3 is possible by using the data transfer circuit 1*c*, and transmits the control data to the data transfer circuit 1*c* so that the control data is transferred to the exchange execution unit 31 in the exchange 3.

The data transfer circuit 1*c*, in response to receipt of the control data from the local area network side interface, transfers the control data to the data transfer circuit 36 in the exchange 3 connected via the exclusive digital line thereto. The data transfer circuit 36, in response to receipt of the control data from the exclusive digital line side interface, transmits, according to the destination exchange identification number data and also with reference to the routing data having been transmitted from the communication control unit and held therein as noted above, the control data via the local area network side interface for the transfer of the control data to the exchange execution unit 31 in the exchange 3. The control data transmitted from the data transfer circuit 36 in the exchange 3 to the local area network side, is transferred via the HUB 35, communication control driver 34, logical connection control circuit 33 and communication control unit 32 to the exchange execution unit 31 in the exchange 3.

As has been shown, in the logical connection control system according to the present invention, an interface connected to the local area network is mounted in a data transfer circuit for establishing a logical inter-exchange connection such that it can connect a plurality of data transfer circuits provided in an exchange to one another. Thus, individual data transfer circuits can jointly establish logical inter-exchange connection. It is thus possible to readily realize logical connection, which is simple in physical hardware constitution and realizes a logical mesh structure.

In addition, since a plurality of data transfer circuits can be connected to one another by the local area network interface, when a data transfer circuit receives data to be transferred to a different exchange from its own, the load of the CPU (i.e., software processing) in the own exchange can be alleviated by the execution of a process of data transfer between the data transfer circuits by using the local area network side interface.

The subject matter of the present invention is applicable not only to a system, in which each data transfer circuit and communication control drive are connected via the local area network as noted above, but also to a system, in which the local area network is replaced with a different data transfer medium, such as an ATM network or radio (including satellite communication).

According to the present invention, with a local area network interface mounted in a data transfer circuit for establishing logical inter-exchange connection such as to be able to connect a plurality of data transfer circuits to one another, it is possible to readily realize a logical mesh structure without unnecessarily loading the CPU in each exchange, thus improving the system maintenance property and the reliability of the logical connection.

Changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

What is claimed is:

1. An exchange network comprising:
    a plurality of exchanges; and
    a logical connection control system,
    wherein each of said plurality of exchanges includes:
        an exchange execution unit;
        a communication control unit for controlling execution of communication between said plurality of exchanges;
        a logical connection control circuit for establishing a route for exchanging control data with a different one of said plurality of exchanges, and for establishing a logical connection between said exchanges for exchanging control data therebetween;
        a plurality of data transfer circuits each having two different interfaces, one connected to an exclusive digital line and another connected to a local area network,
    wherein the communication control unit is capable of being connected to a data transfer circuit of another of said plurality of exchanges via the exclusive digital line while also being connected to all of the data transfer circuits of its own exchange via the local area network,
    wherein when one of the data transfer circuits of one of the exchanges receives data transmitted from a different exchange via an exclusive digital line, the one data transfer circuit refers to a destination exchange identification number contained in the received data and, if the received data is destined to a different exchange, determines, from routing data that has been previously distributed from the communication control unit and which is stored at the one data transfer circuit, which of the data transfer circuits of said one of said plurality of exchanges to route the received data through, in order to provide direct transmission and reception of data between the data transfer circuits without utilization of any control by the exchange execution unit but with utilization of the local area network,
    wherein when no data transfer circuit for providing data to the different exchange is found as a data relay destination in the local area network of said one of said plurality of exchanges is present, the one data transfer circuit informs the communication control unit that no relay destination is present, and
    wherein, when the communication control unit is informed from the one data transfer circuit that no relay destination is present, the communication control unit retrieves, with reference to routing data stored in the routing data control circuit, information concerning whether or not a data transfer circuit of said one of said plurality of exchanges is present as a relay destination data transfer circuit in a different local area network from the local area network connected to the one data transfer circuit and, if the relay destination data transfer circuit is present, the communication control unit secures communication between said one of said plurality of exchanges and the different exchange by transmitting data to the relay destination data transfer circuit.

2. An exchange network according to claim 1, further comprising:
    a first local area network connector that provides connectivity to the local area network;
    a second local area network connector that provides connectivity to the different local area network;
    a first communication control driver that operates as a driver interface between the logical connection control circuit and the first local area network connector; and
    a second communication control driver that operates as a driver interface between the logical connection control circuit and the second local area network connector,
    wherein the first and second local area network connectors provides for data transfer between different data transfer circuits connected to the same local area network, based on information provided by way of the destination exchange identification number, and
    wherein the logical connection control circuit provides for data transfer between the local area network and the different local area network, by way of the first and second communication control drivers, based on information provided by way of the communication control unit of the exchange.

3. A method of transferring data between a first exchange and a second exchange in an exchange network that includes a plurality of exchanges, wherein each of said plurality of exchanges includes an exchange execution unit for assembling data to be transferred to another of said plurality of exchanges, a communication control unit for providing communication control for data transfer with respect to another of said plurality of exchanges, a first local area network that connects a first plurality of data transfer circuits, and a second local area network that is separate from said first local area network that that connects a second plurality of data transfer circuits, said method comprising:
    a) receiving data by one of said plurality of data transfer circuits that is connected to the first local area network;
    b) determining, by the one data transfer circuit based on information included with the data, whether or not a destination exchange can be accessed by way of any of the first plurality of data transfer circuits;
    c) if the determining step b) is that the access is possible by way of any of the first plurality of data transfer circuits, then transferring the data to the destination exchange by one of the first plurality of data transfer circuits;
    d) if the determining step b) is that the access is not possible by way of any of the first plurality of data transfer circuits,
        d1) sending the data to the communication control unit for further processing;
        d2) determining, by the communication control unit, based on information obtained from a routing data control circuit communicatively connected to the communication control unit, whether or not any of the second plurality of data transfer circuits is capable of transferring the data to the destination exchange, and if so, sending the data to the second local area network so that the data can be sent via one of the second plurality of data transfer circuits to the exchange, and if not, not sending the data to any of the data transfer circuits to thereby abandon a data transfer procedure of the data to the destination exchange.

* * * * *